US011660747B2

(12) United States Patent
Oaki et al.

(10) Patent No.: US 11,660,747 B2
(45) Date of Patent: May 30, 2023

(54) PICKING APPARATUS, CONTROL APPARATUS, AND PROGRAM

(71) Applicants: KABUSHIKI KAISHA TOSHIBA, Tokyo (JP); Toshiba Infrastructure Systems & Solutions Corporation, Kawasaki (JP)

(72) Inventors: Junji Oaki, Kawasaki Kanagawa (JP); Tetsuya Masuda, Kawasaki Kanagawa (JP); Haruhiko Horiuchi, Yokohama Kanagawa (JP); Junichi Inoue, Kawasaki Kanagawa (JP); Takafumi Ushiyama, Yokohama Kanagawa (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 158 days.

(21) Appl. No.: 17/185,197

(22) Filed: Feb. 25, 2021

(65) Prior Publication Data

US 2021/0323147 A1 Oct. 21, 2021

(30) Foreign Application Priority Data

Apr. 21, 2020 (JP) .............................. JP2020-075350

(51) Int. Cl.
*B25J 9/16* (2006.01)
*B25J 13/08* (2006.01)

(52) U.S. Cl.
CPC .......... *B25J 9/1633* (2013.01); *B25J 9/1612* (2013.01); *B25J 9/1676* (2013.01); *B25J 13/085* (2013.01)

(58) Field of Classification Search
CPC ...... B25J 9/1633; B25J 9/1612; B25J 9/1676; B25J 13/085; B25J 9/1638; B25J 9/1679;
(Continued)

(56) References Cited

U.S. PATENT DOCUMENTS

2004/0265110 A1\* 12/2004 Schnoor ................. B25J 9/1638
414/729
2015/0328771 A1\* 11/2015 Yuelai ................... B25J 13/085
414/730

(Continued)

FOREIGN PATENT DOCUMENTS

EP 3 599 064 A2 1/2020
EP 3 623 115 A1 3/2020
(Continued)

*Primary Examiner* — Abby Y Lin
*Assistant Examiner* — Dylan M Katz
(74) *Attorney, Agent, or Firm* — Finnegan, Henderson, Farabow, Garrett & Dunner, LLP

(57) ABSTRACT

A picking apparatus in an embodiment includes: a gripper, an arm, a detector, and a control unit. The gripper picks and grips an object to be conveyed. The arm moves the gripper and causes the gripper to convey the object to be conveyed. The detector is attached to the arm and senses a force applied to the gripper. The control unit controls an operation of the gripper and the arm. The control unit includes a calculator and a subtractor. The calculator calculates a gravitational force and an inertial force applied to the gripper when the gripper grips and moves the object to be conveyed using an arithmetic expression including a coefficient determined in accordance with a mass of the object to be conveyed. The subtractor subtracts the gravitational force and the inertial force calculated by the calculator from a force applied to the gripper sensed by the detector.

8 Claims, 13 Drawing Sheets

(58) Field of Classification Search
CPC .................. B25J 9/1666; B25J 9/1687; G05B 2219/37624; G05B 2219/39082; G05B 2219/39194; G05B 2219/40053; G05B 2219/45063

See application file for complete search history.

(56) References Cited

U.S. PATENT DOCUMENTS

| | | |
|---|---|---|
| 2016/0075031 A1 | 3/2016 | Gotou |
| 2016/0176052 A1 | 6/2016 | Yamamoto |
| 2020/0171678 A1* | 6/2020 | Holyoak ................. B25J 19/002 |
| 2020/0298417 A1* | 9/2020 | Naitou .................. B25J 13/085 |
| 2021/0268660 A1* | 9/2021 | Okuyama .............. B25J 9/1697 |

FOREIGN PATENT DOCUMENTS

| | | |
|---|---|---|
| JP | 5905549 B1 | 4/2016 |
| JP | 2020-40132 A | 3/2020 |

* cited by examiner

FIG. 3

| MASS[kg] | gxs | gxc | gxf | gzs | gzc | gzf |
|---|---|---|---|---|---|---|
| 0 | ○○ | ○○ | ○○ | ○○ | ○○ | ○○ |
| 1 | ○○ | ○○ | ○○ | ○○ | ○○ | ○○ |
| 2 | ○○ | ○○ | ○○ | ○○ | ○○ | ○○ |
| 3 | ○○ | ○○ | ○○ | ○○ | ○○ | ○○ |
| 4 | ○○ | ○○ | ○○ | ○○ | ○○ | ○○ |
| 5 | ○○ | ○○ | ○○ | ○○ | ○○ | ○○ |
| 6 | ○○ | ○○ | ○○ | ○○ | ○○ | ○○ |
| 7 | ○○ | ○○ | ○○ | ○○ | ○○ | ○○ |
| 8 | ○○ | ○○ | ○○ | ○○ | ○○ | ○○ |
| 9 | ○○ | ○○ | ○○ | ○○ | ○○ | ○○ |
| 10 | ○○ | ○○ | ○○ | ○○ | ○○ | ○○ |

FIG. 4

| MASS[kg] | m1x | m1z | m1o | m2x | m2z | m2o |
|---|---|---|---|---|---|---|
| 0 | ○○ | ○○ | ○○ | ○○ | ○○ | ○○ |
| 1 | ○○ | ○○ | ○○ | ○○ | ○○ | ○○ |
| 2 | ○○ | ○○ | ○○ | ○○ | ○○ | ○○ |
| 3 | ○○ | ○○ | ○○ | ○○ | ○○ | ○○ |
| 4 | ○○ | ○○ | ○○ | ○○ | ○○ | ○○ |
| 5 | ○○ | ○○ | ○○ | ○○ | ○○ | ○○ |
| 6 | ○○ | ○○ | ○○ | ○○ | ○○ | ○○ |
| 7 | ○○ | ○○ | ○○ | ○○ | ○○ | ○○ |
| 8 | ○○ | ○○ | ○○ | ○○ | ○○ | ○○ |
| 9 | ○○ | ○○ | ○○ | ○○ | ○○ | ○○ |
| 10 | ○○ | ○○ | ○○ | ○○ | ○○ | ○○ |

PICKING APPARATUS, CONTROL APPARATUS, AND PROGRAM

TECHNICAL FIELD

Embodiments of the present invention relate to a picking apparatus, a control apparatus, and a program.

BACKGROUND ART

In a picking apparatus which picks, grips, and conveys an object to be conveyed, if a collision occurs between conveyed objects and the picking apparatus while the conveyed objects are being conveyed, articles may be dropped or damaged in some cases. For this reason, although it is desired to perform a determination concerning whether a collision will occur while articles are being conveyed, it is difficult to perform simple determination concerning a collision.

CITATION LIST

Patent Document

[Patent Document 1]
Japanese Patent No. 5905549

SUMMARY OF INVENTION

Technical Problem

An object to be achieved by the present embodiments is to provide a picking apparatus, a control apparatus, and a program capable of easily detecting a collision occurring during conveyance of an object to be conveyed.

A picking apparatus in an embodiment includes: a gripper, an arm, a detector, and a control unit. The gripper picks and grips an object to be conveyed. The arm moves the gripper and causes the gripper to convey the object to be conveyed. The detector is attached to the arm and senses a force applied to the gripper. The control unit controls an operation of the gripper and the arm. The control unit includes a calculator and a subtractor. The calculator calculates a gravitational force and an inertial force applied to the gripper when the gripper grips the object to be conveyed using an arithmetic expression including a coefficient determined in accordance with a mass of the object to be conveyed. The subtractor subtracts the gravitational force and the inertial force calculated by the calculator from a force applied to the gripper sensed by the detector.

BRIEF DESCRIPTION OF DRAWINGS

FIG. 3 is a diagram illustrating an example of a gravity compensation parameter table 282.

FIG. 4 is a diagram illustrating an example of an inertial force compensation parameter table 284.

DESCRIPTION OF EMBODIMENTS

Figure 1:
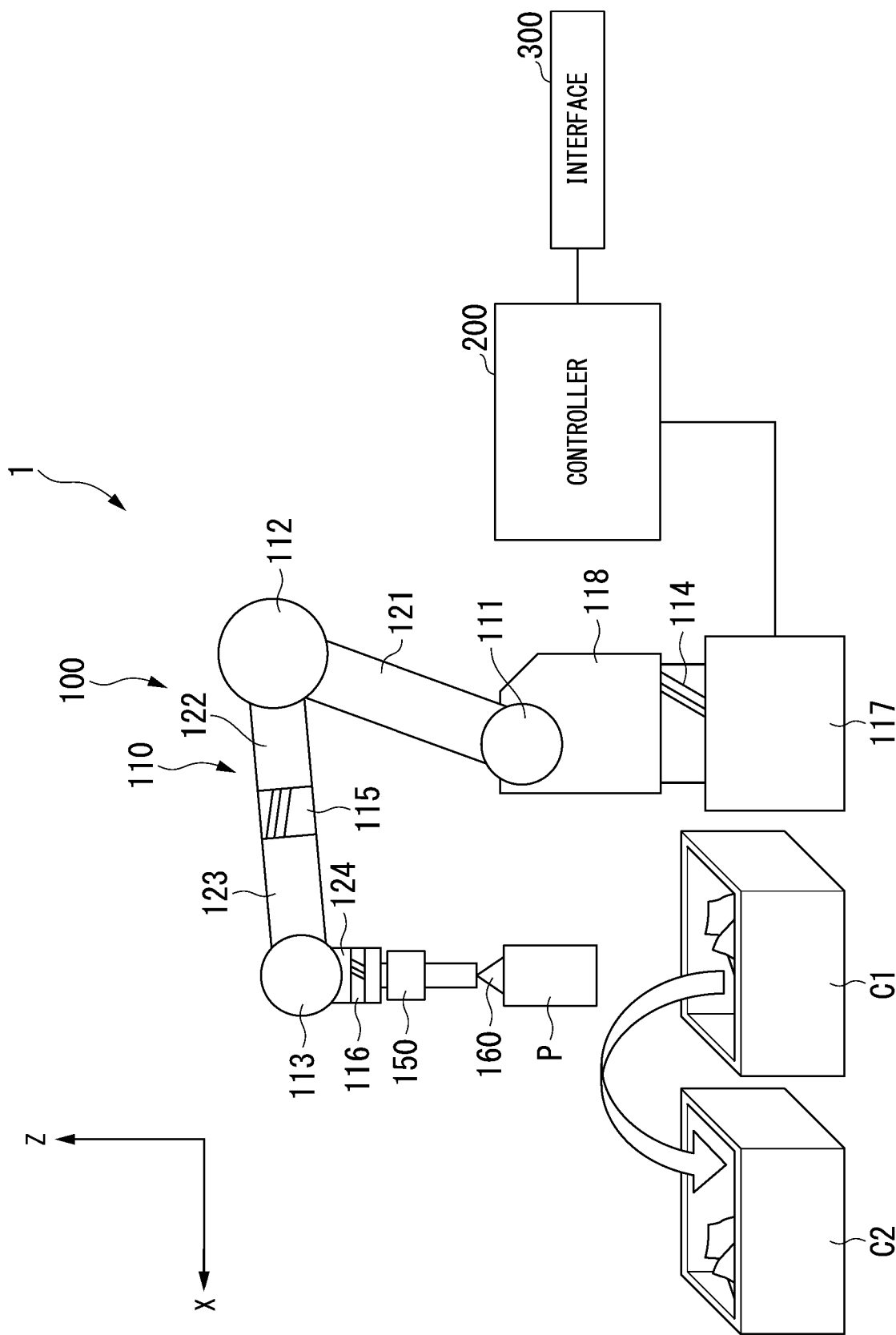
FIG. 1 is a diagram illustrating the entire picking apparatus 1 in an embodiment.

A picking apparatus, a control apparatus, and a program in an embodiment will be described below with reference to the drawings. In the following description, constituent elements having the same or similar functions will be denoted by the same reference numerals and duplicate description thereof will be omitted in some cases. The expression "based on X" mentioned in this specification refers to the expression "based on at least X" and includes a case in which it is based on another element in addition to XX. Furthermore, the expression "based on X" is not limited to a case in which X is utilized directly and includes a case of being based on that in which X has been subjected to calculation or processing. The term "X" is an arbitrary element (for example, arbitrary information).

FIG. 1 is a diagram illustrating the entire picking apparatus in an embodiment. A picking apparatus 1 includes a picking robot 100, a controller 200, and an interface 300. The picking robot 100 includes a six joint robot arm for picking. For example, the picking apparatus 1 conveys an article gripped in an article container and packs the article in a collection container. The picking apparatus 1 includes a belt conveyor configured to pull each container, a camera configured to recognize an article, and the like, in addition to these elements.

The picking robot 100 includes an arm part 110, a force sensor 150, and a suction hand 160. For example, the picking robot 100 suctions an object to be conveyed P accommodated in an article container C1 and conveys the object to be conveyed P to a collection container C2. The controller 200 is an example of a control apparatus, the force sensor 150 is an example of a sensor, and the suction hand 160 is an example of a gripper.

The arm part 110 includes six joints which are a first joint 111 to a sixth joint 116. The first joint 111 to the sixth joint 116 are disposed between a base 117 and the suction hand 160. Although the first joint to the sixth joint are usually named in ascending order in order from a side closer to the base 117, in the embodiment, for the sake of convenience of explanation, a description will be provided by appropriately changing the order. A body 118 is provided on the base 117 via a fourth joint 114 and one end of a first link 121 is connected to the body 118 via the first joint 111.

One end of a second link 122 is connected to the other end of the first link 121 via a second joint 112 and one end of a third joint 123 is connected to the other end of the second link 122 via a fifth joint 115. The second link 122 and the third joint 123 are located coaxially. One end of a wrist 124 is connected to the other end of the third joint 123 via a third joint 113 and the sixth joint 116 is connected to the other end of the wrist 124. The force sensor 150 is attached to the sixth joint 116 and the suction hand 160 is attached to the force sensor 150.

Motors driven through control of the controller 200 are provided in the first joint 111 to the sixth joint 116. The fourth joint 114 rotates the body 118 around a vertical joint with respect to the base 117. The first joint 111 rotates the first link 121 around a horizontal joint with respect to the body 118. The second joint 112 rotates the second link 122 around the horizontal joint with respect to the first link 121.

The fifth joint 115 rotates the third joint 123 around a joint in a direction in which the second link 122 extends. The third joint 113 rotates the wrist 124 around a joint orthogonal to two joints in directions in which the third joint 123 and the wrist 124 extend with respect to the third joint 123. The sixth joint 116 is used so that the force sensor 150 and the suction hand 160 are rotated around a joint in a direction in which the wrist 124 extends.

The force sensor 150 senses a force applied to the suction hand 160. The force sensor 150 senses the force applied to the suction hand 160 by dividing the force into components in XYZ directions. The force sensor 150 outputs the sensing results as a sensing signal to the controller 200. The suction hand 160 grips the object to be conveyed P or releases the gripped object to be conveyed P in accordance with the control of the controller 200. The suction hand 160 may be a unit configured to hold the object to be conveyed P in place of a unit configured to suction the object to be conveyed P.

Figure 2:
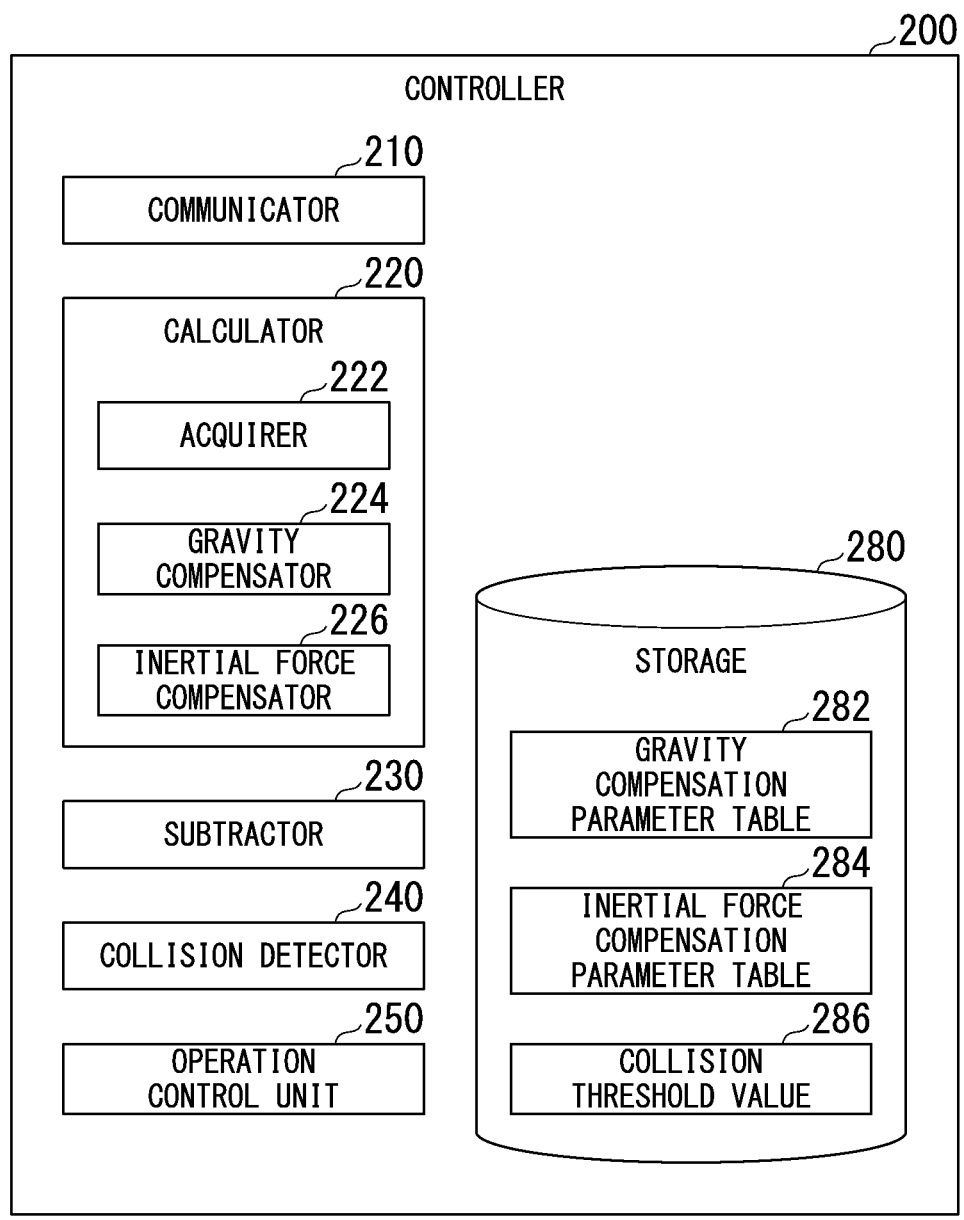
FIG. 2 is a diagram illustrating a constitution of a controller 200.

FIG. 2 is a diagram illustrating a constitution of the controller 200. The controller 200 includes, for example, a communicator 210, a calculator 220, a subtractor 230, a collision detector 240, an operation control unit 250, and a storage 280. The calculator 220, the subtractor 230, the collision detector 240, and the operation control unit 250 are realized through, for example, a program (software) executed using a hardware processor such as a central processing unit (CPU) (a computer). Furthermore, some or all of these constituent elements may be realized using hardware (a circuit unit; including circuitry) such as a large scale integration (LSI), an application specific integrated circuit (ASIC), a field-the programmable gate array (FPGA), and a graphics processing unit (GPU) or may be realized in cooperation with software and hardware. The program may be stored in advance in a storage apparatus (a storage apparatus including a non-transitory storage medium) such as an HDD or a flash memory of the controller 200, stored in a removable storage medium such as a DVD or a CD-ROM, or installed in an HDD or a flash memory of the controller 200 when a storage medium (a non-transitory storage medium) is installed in a drive apparatus. The storage 280 stores a gravity compensation parameter table 282, an inertial force compensation parameter table 284, and a collision threshold value 286. The hardware processor including the calculator 220, the subtractor 230, the collision detector 240, and the operation control unit 250 is an example of a control unit.

The communicator 210 inputs/outputs, for example, information and a signal to/from the picking robot 100, the interface 300, and the like. The communicator 210 notifies, for example, the calculator 220 of a sensing signal output by the force sensor 150. The communicator 210 outputs, for example, an operation control signal which is a notification of the operation control unit 250 to the motors of the arm part 110 or the suction hand 160.

The calculator 220 includes, for example, an acquirer 222, a gravity compensator 224, and an inertial force compensator 226. The acquirer 222 calculates and acquires a mass of the object to be conveyed P conveyed by the picking robot 100 on the basis of a sensing signal output by the force sensor 150. The acquirer 222 notifies the gravity compensator 224 and the inertial force compensator 226 of mass information indicating the mass of the measured object to be conveyed P. The picking robot 100 may include a measurer configured to measure the mass of the object to be conveyed P and the acquirer 222 may acquire the mass of the object to be conveyed P output by the measurer in place of or in addition to the force sensor 150.

The gravity compensator 224 selects, for example, a compensation gravity calculation expression for calculating a compensation gravity value and gravity compensation parameters according to the mass of the object to be conveyed P conveyed by the picking robot 100. The gravity compensator 224 calculates a gravity component included in a force sensed by the force sensor 150 using the selected gravity compensation parameters. The gravity compensator 224 is an example of a selector. The gravity compensator 224 notifies the subtractor 230 of the calculated compensation gravity value. The compensation gravity calculation expression will be described later.

FIG. 3 is a diagram illustrating an example of the gravity compensation parameter table 282. The gravity compensation parameters are, for example, collected for each mass of the object to be conveyed P and stored in the storage 280 as the gravity compensation parameter table 282. Gravity compensation parameters corresponding to a total of 11 masses for each 1 [kg] from 0 [kg] to 10 [kg] are stored in the gravity compensation parameter table 282. As the gravity compensation parameters, for example, six gravity compensation parameters $g_{xs}$, $g_{xc}$, $g_{xf}$, $g_{zs}$, $g_{zc}$, and $g_{zf}$ used in the compensation gravity calculation expression are stored. The gravity compensation parameters are an example of a gravity calculation coefficient for calculating gravity. A gravity compensation parameter of 0 [kg] is an example of a first coefficient in a state in which the suction hand 160 is not griping the object to be conveyed P and gravity compensation parameters of 1 [kg] to 10 [kg] are examples of a second coefficient when the suction hand 160 has loads and examples of classification correspondence coefficients classified in accordance with the mass of the object to be conveyed P gripped by the suction hand 160. A procedure in which the gravity compensation parameters are determined and the gravity compensation parameter table 282 is created will be described later.

The inertial force compensator 226 selects, for example, a compensation inertial force calculation expression for calculating a compensated inertial force value and inertial force compensation parameters according to the mass of the object to be conveyed P conveyed by the picking robot 100. The inertial force compensator 226 calculates an inertial force component included in a force sensed by the force sensor 150 using the selected inertial force compensation parameters. The inertial force compensator 226 is an example of a selector. When it is used, an inertial force component included in a force sensed by the force sensor 150 is calculated. The inertial force compensator 226 notifies the subtractor 230 of the calculated compensated inertial force value. The compensation inertial force calculation expression will be described later.

FIG. 4 is a diagram illustrating an example of the inertial force compensation parameter table 284. The inertial force compensation parameters are, for example, collected for each mass of the object to be conveyed P and stored in the storage 280 as the inertial force compensation parameter table 284. In the inertial force compensation parameter table 284, inertial force compensation parameters corresponding to a total of 11 masses for each 1 [kg] from 0 [kg] to 10 [kg] are stored. As the inertial force compensation parameters, for example, three inertial force compensation parameters mix, m1z, $m_{I_o}$ and $m_{2x}$, $m_{2z}$, $m_{2o}$ used in the compensation inertial force calculation expression are stored. The inertial force compensation parameters are examples of an inertial force calculation coefficient for calculating an inertial force. Inertial force compensation parameters of 0 [kg] are examples of a first coefficient and inertial force compensation parameters of 1 [kg] to 10 [kg] are second coefficients when the suction hand 160 has loads and examples of a classification correspondence coefficient. A procedure in which the inertial force compensation parameters are determined and the inertial force compensation parameter table 284 is created will be described later.

The subtractor 230 subtracts a compensation gravity value which is a notification of the gravity compensator 224 and a compensated inertial force value which is a notification of the inertial force compensator 226 from a force based on a sensing signal output by the force sensor 150. The subtractor 230 notifies the collision detector 240 of the subtraction result.

The collision detector 240 detects that a collision will occur in the picking robot 100 when the object to be conveyed P is conveyed on the basis of the comparison result of comparing the subtraction result which is a notification of the subtractor 230 with the collision threshold value 286 stored in the storage 280. The expression "collision will occur in the picking robot 100" includes, for example, when the arm part 110, the force sensor 150, the suction hand 160, or the like of the picking robot 100 will collide (come into contact) with another object and when the object to be conveyed P conveyed by the picking robot 100 will collide (comes into contact) with another object which is not scheduled to come into contact with it in the process of conveyance. The collision detector 240 notifies the operation control unit 250 of a collision signal when detecting that a collision will occur in the picking robot 100.

The operation control unit 250 controls the motors and the suction hand 160 of the picking robot 100 in accordance with a motion command input by an operator using the interface 300. The operation control unit 250 stops an operation of the motors and the suction hand 160 of the picking robot 100 when the collision detector 240 notifies of a collision signal.

The interface 300 includes, for example, an input apparatus and a display apparatus. The input apparatus is, for example, a device which can be operated by a user such as an operator and by which prescribed information is input, for example, a mouse. An operation apparatus may be a device other than a mouse, such as, for example, a keyboard or a joystick. The display apparatus may be a touch panel and the display apparatus and the input apparatus may be integrally formed.

Figure 5:
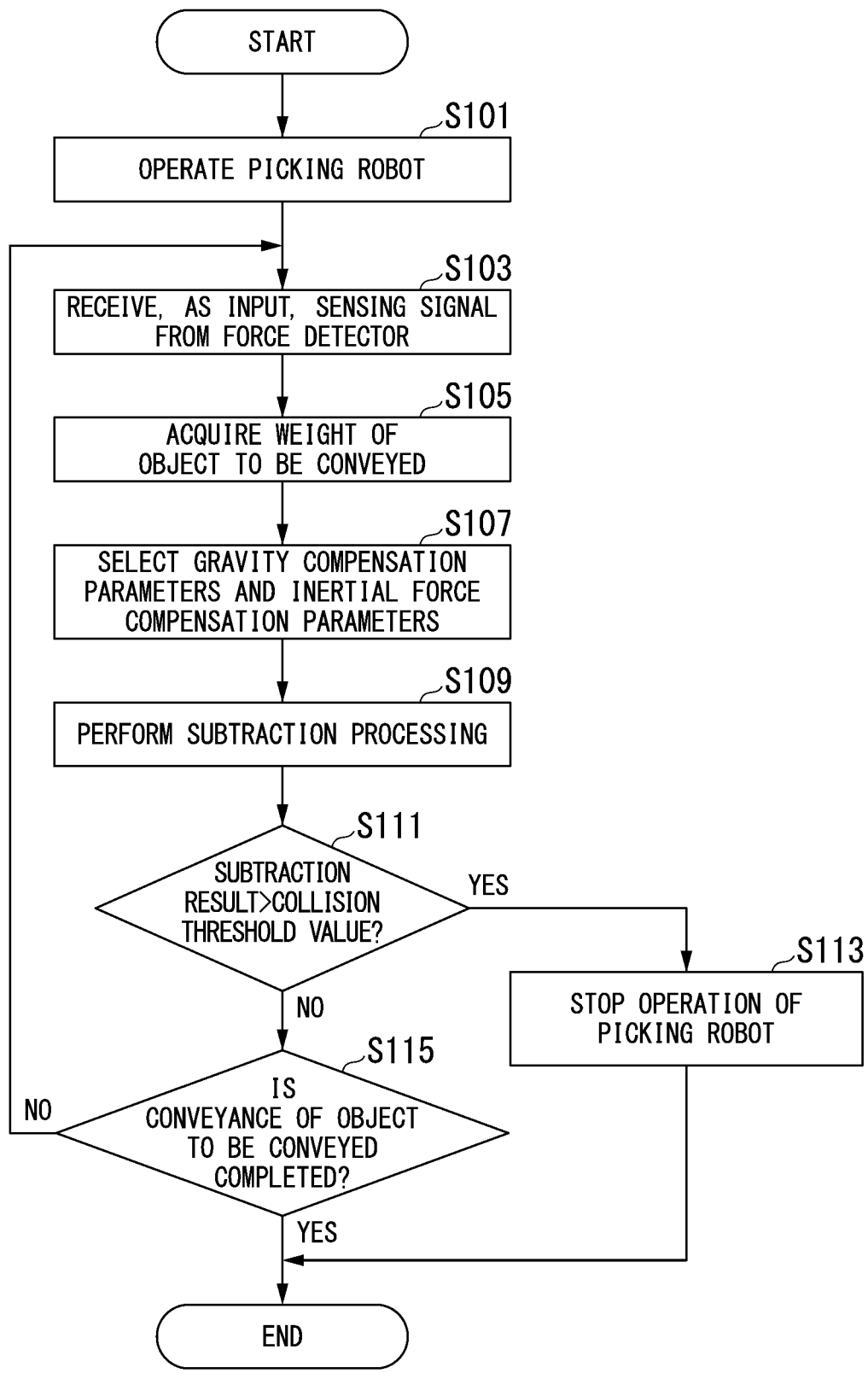
FIG. 5 is a flowchart for describing an example of processing of the controller 200.

Processing of the controller 200 will be described below. FIG. 5 is a flowchart for describing an example of processing of the controller 200. For example, the controller 200 causes the picking robot 100 to be operated in accordance with an input operation performed on the interface 300 by an operator (Step S101) and causes an object to be conveyed P to be conveyed from the article container C1 to the collection container C2. When the picking robot 100 is operated, the force sensor 150 senses a force applied to the suction hand 160. The force sensor 150 outputs a sensing signal according to the sensed result to the controller 200.

Subsequently, the communicator 210 receives, as an input, the sensing signal output by the force sensor 150 (Step S103) and notifies the calculator 220 of the sensing signal. The acquirer 222 in the calculator 220 calculates and acquires the mass of the object to be conveyed P conveyed by the suction hand 160 on the basis of the sensed result according to the notified sensing signal (Step S105).

Subsequently, the gravity compensator 224 and the inertial force compensator 226 select gravity compensation parameters and inertial force compensation parameters from the gravity compensation parameter table 282 and the inertial force compensation parameter table 284 on the basis of the mass of the object to be conveyed P acquired by the acquirer 222 (Step S107).

Subsequently, the subtractor 230 performs a subtraction process of subtracting the gravity compensation parameters and the inertial force compensation parameters from the mass indicated by the sensed result corresponding to the sensing signal output by the force sensor 150 (Step S109) and calculates a subtraction value.

Subsequently, the collision detector 240 determines whether the subtraction value exceeds a collision threshold value by comparing the subtraction value calculated by the subtractor 230 with the collision threshold value stored in the storage 280 (Step S111). When it is determined that the subtraction value exceeds the collision threshold value, the collision detector 240 outputs a collision signal to the operation control unit 250 and the operation control unit 250 stops an operation of the picking robot 100 (Step S113). When the collision detector 240 detects a collision and the operation control unit 250 stops the operation of the picking robot 100, the controller 200 causes a display control apparatus of the interface 300 to display the fact that the collision has occurred.

When the collision detector 240 determines that the subtraction value does not exceed the collision threshold value (is the collision threshold value or less), the operation control unit 250 determines whether the object to be conveyed P has been conveyed from the article container C1 to the collection container C2 and the conveyance is completed (Step S115). When it is determined that the conveyance is not completed, the process of the operation control unit 250 returns to the process of Step S103. When it is determined that the conveyance is completed, the controller 200 ends the process illustrated in FIG. 5.

A procedure in which gravity compensation parameters and inertial force compensation parameters are determined will be described below together with a principle used for collision determination. The gravity compensation parameters and inertial force compensation parameters are estimated and determined, for example, using a parameter estimation apparatus (hereinafter referred to as an "estimation apparatus") before the gravity compensation parameter table 282 and the inertial force compensation parameter table 284 are stored in the picking apparatus 1. The estimation apparatus, for example, actually operates the picking robot 100 and estimates the gravity compensation parameters and the inertial force compensation parameters.

In the embodiment, a description will be provided by simulating the arm part 110 of the picking robot 100 including a six joint robot arm as a vertically swivel three-joint robot arm. Although a description will be provided using a two-dimensional rotation matrix by simulating the six-dimensional arm part 110 as a two-dimensional three-joint robot arm in the embodiment, with regard to the six-dimensional arm part 110, it is possible to control the picking robot 100 using a common principle simply by changing the two-dimensional rotation matrix to a three-dimensional rotation matrix.

As a basic idea, first, when the suction hand 160 is in a no load state, a gravitational force and an inertial force applied to the force sensor 150 are fully removed. For this reason, a fitting process based on the offline least squares method is performed, gravity compensation parameters and inertial force compensation parameters are estimated and determined as parameters for real-time gravitational force and inertial force compensation calculations. When the mass of the suction hand 160 is larger than object to be conveyed P, it is possible to reduce the collision threshold value only using the gravity compensation parameters and the inertial force compensation parameters in this case.

Figure 6:
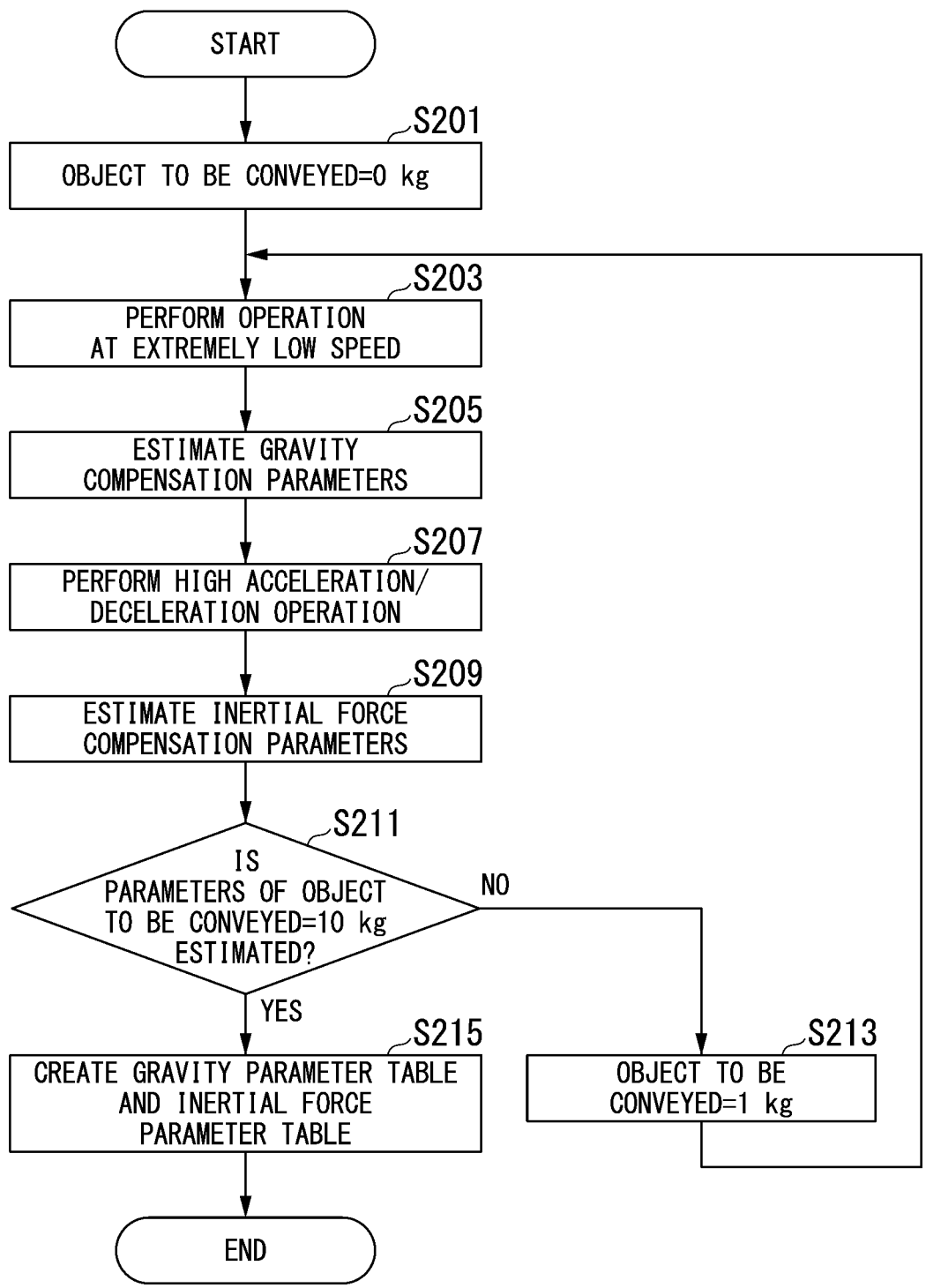
FIG. 6 is a flowchart for describing an example a procedure of creating the gravity compensation parameter table 282 and the inertial force compensation parameter table 284.

A principle in which a difference between a gravitational force and an inertial force in a state in which an object to be conveyed P is gripped is compensated will be described below. Although the compensation mentioned herein is that a kinetic model of a robot arm is non-linear, physical parameters used for providing a mass and inertia are linear and the fact that a superposition theorem is achieved is utilized for the compensation for an inertial force and a gravitational force FIG. 6 is a flowchart for describing an example of a procedure in which the gravity compensation parameter table 282 and the inertial force compensation parameter table 284 are created. First, it is assumed that the suction hand 160 in the estimation apparatus is in a no load state (a state in which an object to be conveyed P of 0 [kg] is conveyed) (Step S201). Subsequently, the estimation apparatus causes the arm part 110 of the picking robot 100 to be operated at an extremely low speed (Step S203) and estimates the gravity compensation parameters (Step S205).

If the arm part 110 is operated at an extremely low speed, an inertial force applied to the force sensor 150 is negligibly reduced. Thus, it is possible to extract the effect of the gravitational force as an influence of a force accompanied by the operation of the picking robot 100. As a base coordinate system utilized for the explanation, a Z axis in a vertical direction and an X axis in a horizontal direction are defined. A rotation angle (hereinafter referred to as a "first rotation angle") 01 of the first joint 111, a rotation angle (hereinafter referred to as a "second rotation angle") 02 of the second joint 112, and a rotation angle (hereinafter referred to as a "third rotation angle") 03 of the third joint 113 when the first link 121, the second link 122, and the third link 123 of the arm part 110 and the wrist 124 simulated in a three-joint robot arm are disposed coaxially along a Z axis are set to 0°. All of the first rotation angle θ1, the second rotation angle θ2, and the third rotation angle θ3 indicate counterclockwise angles when viewed in the direction of FIG. 1. The first rotation angle θ1, the second rotation angle θ2, and the third rotation angle θ3 are examples of angle data.

Also, as a working coordinate system at a distal end of the arm part 110 (a working coordinate system of the suction hand 160), a distal end direction is defined as an $X_E$ axis and a downward direction is defined as a $Z_E$ axis. The working coordinate system at the distal end of the arm part 110 at this time is represented by the following Expression (1):

[Math. 1]

$$T_E = \begin{bmatrix} c_{123} & s_{123} \\ -s_{123} & c_{123} \end{bmatrix} \quad (1)$$

where, $c_{123} = \cos(\theta 1 + \theta 2 + \theta 3)$ $s_{123} = \sin(\theta 1 + \theta 2 + \theta 3)$ From the foregoing Expression (1), it is clear that a gravitational force due to a mass applied to the force sensor 150 is a function of $c_{123}$ and $s_{123}$. A coordinate system of the force sensor 150 is the same as the working coordinate system at the distal end of the arm part 110 and the force sensor 150 senses a first force fx [N] applied in an $X_E$ direction and a second force fz [N] applied in a $Z_E$ direction. Therefore, if the gravity compensation parameters are defined, a relationship between the first force fx in the $X_E$ direction and the second force fz in the $Z_E$ direction and the first rotation angle θ1 to the third rotation angle θ3 can be represented by the following Expressions (2) and (3):

$$fx = g_{xs}s_{123} + g_{xc}c_{123} + g_{xf} \quad (2)$$

$$fz = g_{zs}s_{123} + g_{zc}c_{123} + g_{zf} \quad (3)$$

The third term on the right side in the foregoing Expressions (2) and (3) is an offset provided so that geometric errors and the like are absorbed. The gravity compensation parameters can be calculated by fitting data based on the first rotation angle to the third rotation angle of the picking robot 100 at an extremely low speed and a force sensed by the force sensor 150 through the least squares method using the foregoing Expressions (2) and (3). Gravity compensation parameters $g_{xs}$, $g_{xc}$, $g_{xf}$, $g_{zs}$, $g_{zc}$, and $g_{zf}$ are estimated and determined on the basis of the first rotation angle θ1, the second rotation angle θ2, and the third rotation angle θ3 when the suction hand 160 is operated at an extremely low speed.

Figure 7:
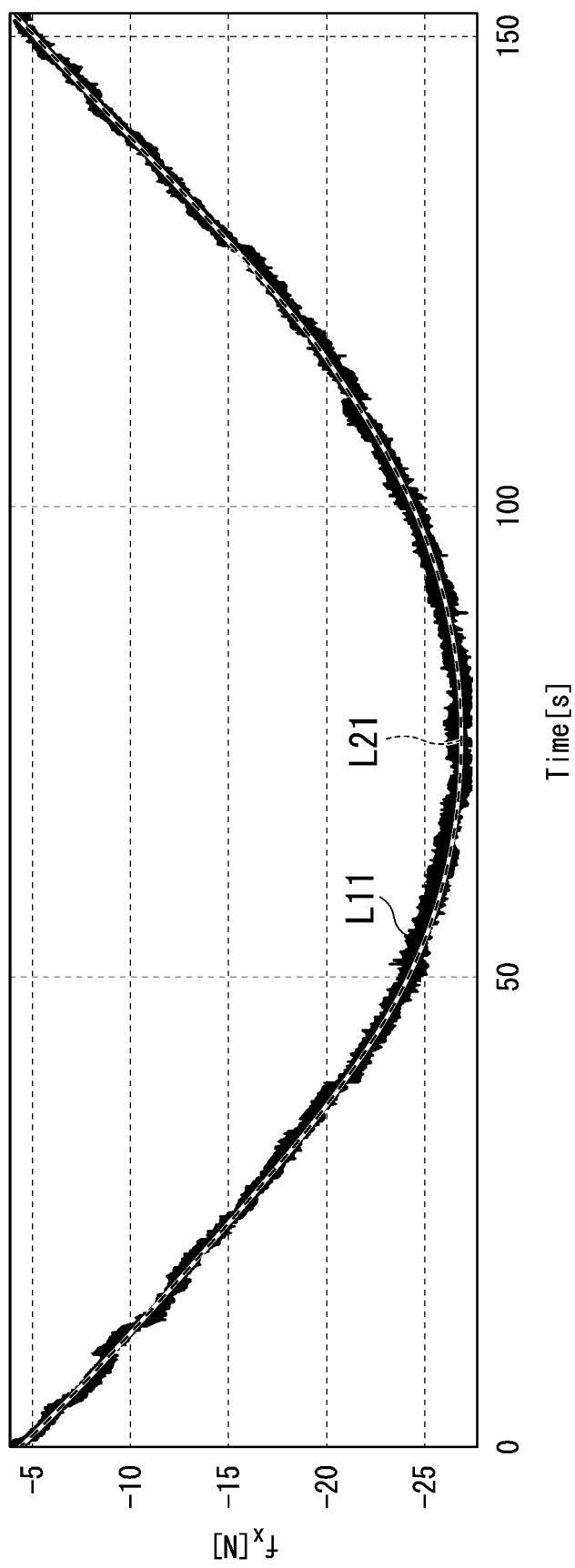
FIG. 7 is a graph for describing an example of a case in which change over time of a first force fx in an $X_E$ direction when a first joint 111 is reciprocated at an extremely low speed is fitted using a least squares method.
Figure 8:
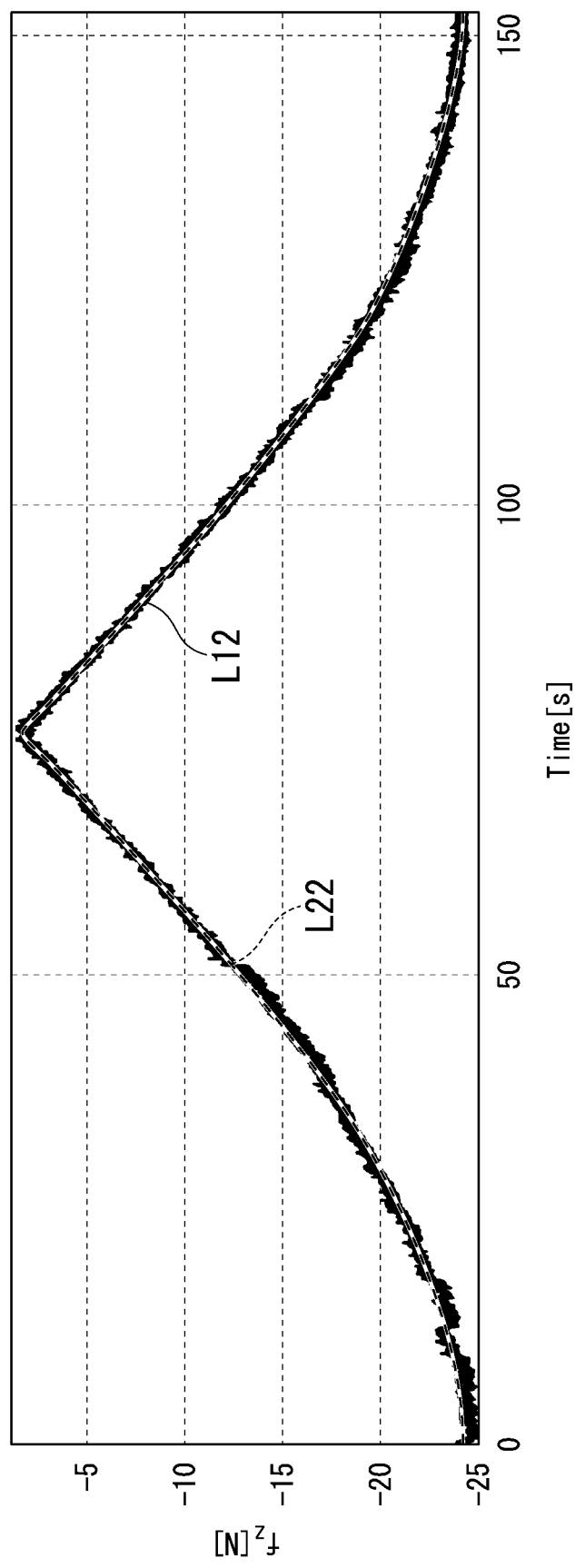
FIG. 8 is a graph for describing an example of a case in which change over time of a first force fx in a $Z_E$ direction when the first joint 111 is reciprocated at an extremely low speed is fitted using a least squares method.

FIG. 7 is a graph for describing an example of a case in which change over time of the first force fx in the $X_E$ direction when the first joint 111 is reciprocated at an extremely low speed is fitted through a least squares method and FIG. 8 is a graph for describing an example of the second force fz in the $Z_E$ direction. In FIG. 7, the first force fx is indicated using a solid line L11 and the fitted graph is indicated using a broken line L21. In FIG. 8, the second force fz is indicated using a solid line L12 and the fitted graph is indicated using a broken line L22. Here, the first joint 111 is reciprocated so that the first rotation angle returns to 0° from 0° to 90°. When the changes illustrated in FIGS. 7 and 8 are obtained, the gravity compensation parameters $g_{xs}$, $g_{xc}$, $g_{xf}$, $g_{zs}$, $g_{zc}$, and $g_{zf}$ have the following numerical values.

$g_{xs} = -2.2856e+01$ $g_{xc} = -5.3106e-01$ $g_{xf}=-4.0144e-00$ $g_{zs}=4.5867e-01$ $g_{zc}=-2.2287e+01$ $g_{zf}=-1.9212e+00$

Subsequently, the estimation apparatus causes the arm part 110 of the picking robot 100 to perform a high acceleration/deceleration operation (Step S207) and estimates inertial force compensation parameters (Step S209). Here, the estimation apparatus causes the arm part 110 to be reciprocated from a state which is first rotation angle θ1=second rotation angle θ2=third rotation angle θ3=0° to first rotation angle θ1=second rotation angle θ2=third rotation angle θ3=0° via a state which is first rotation angle θ1=second rotation angle θ2=third rotation angle θ3=90° at, for example, an acceleration/deceleration of 3 to 40 m/s² and at, for example, a high acceleration/deceleration at a 100% high speed.

Figure 9:
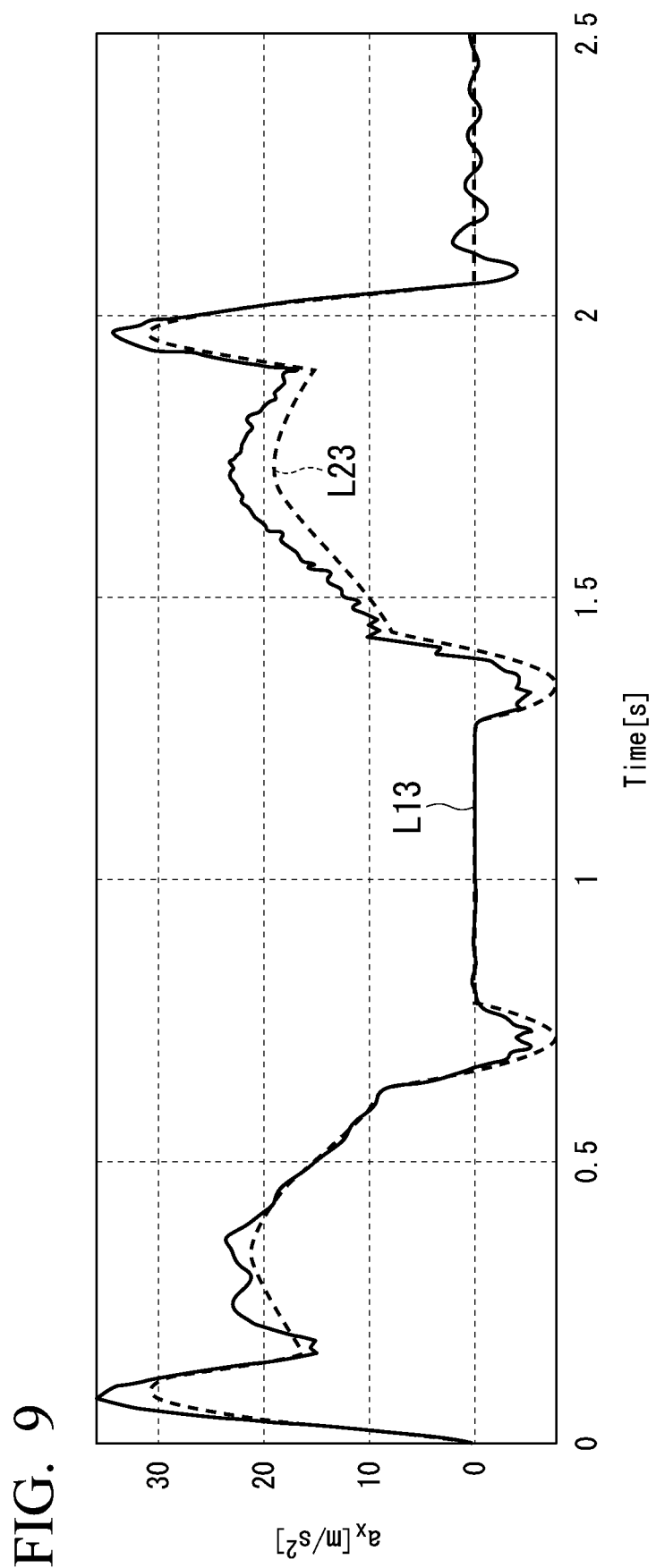
FIG. 9 is a graph for describing an example of an acceleration target value and an actual acceleration in the $X_E$ direction when the first joint 111 to a third joint 113 are reciprocated.
Figure 10:
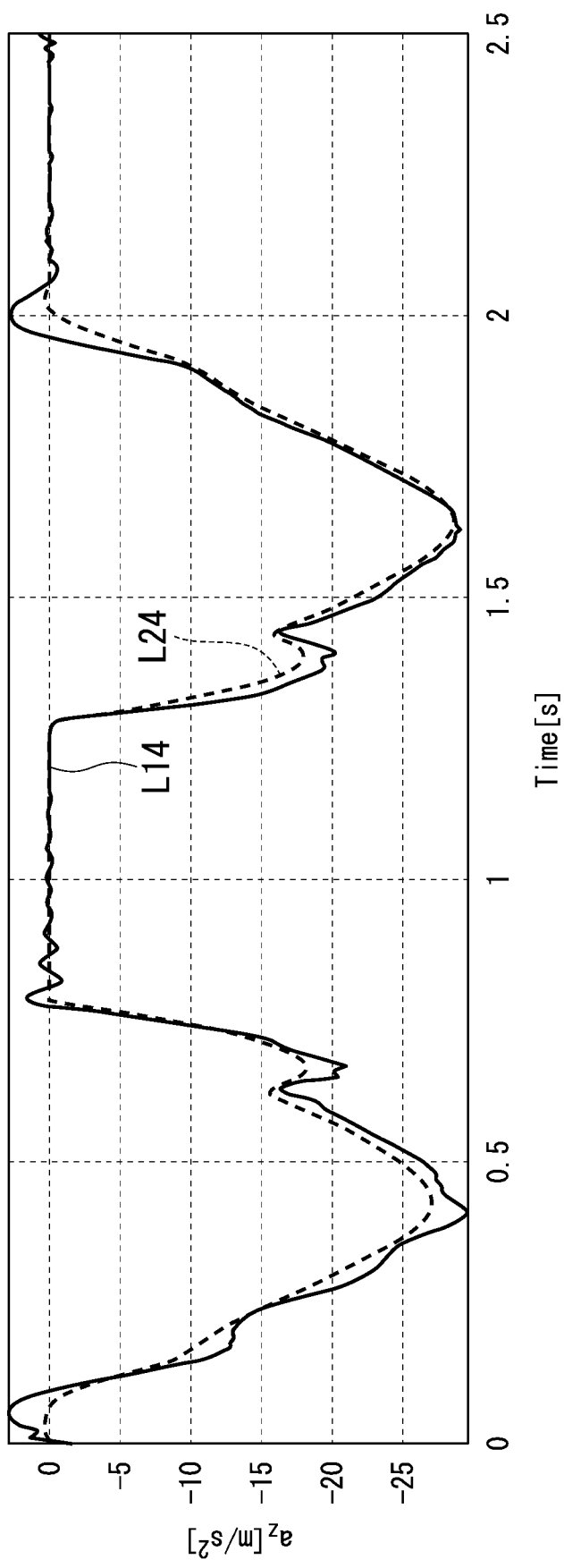
FIG. 10 is a graph for describing an example of an acceleration target value and an actual acceleration in the $Z_E$ direction when the first joint 111 to the third joint 113 are reciprocated.

The acceleration used at the time of the inertial force compensation parameters is set to the acceleration of a position of a center of gravity of the suction hand 160 itself. FIG. 9 is a graph for describing an example of an acceleration target value and an actual acceleration in the $X_E$ direction of a position of a center of gravity when the first joint 111 to the third joint 113 are reciprocated. In addition, FIG. 10 is a graph for describing an example of an acceleration target value and an actual acceleration in the $Z_E$ direction. In FIG. 9, the acceleration target value is indicated using a broken line L23 and an actual acceleration $a_x$ is indicated using a solid line L13. In FIG. 10, the acceleration target value is indicated using a broken line L24 and an actual acceleration $a_z$ is indicated using a solid line L14. In this example, the actual accelerations follow target accelerations well. Thus, as the accelerations, inertial force compensation parameters $m_{1x}$, $m_{1z}$, $m_{1o}$, $m_{2x}$, $m_{2z}$, and $m_{2o}$ are estimated using acceleration target values with less noise.

A relationship between the forces and the accelerations in the $X_E$ direction and the $Z_E$ direction at the distal end of the arm part 110 in the working coordinate system can be represented by the following Expressions (4) and (5). It is possible to estimate inertial force compensation parameters by fitting the acceleration data at the time of the high acceleration/deceleration high-speed operation illustrated in FIGS. 9 and 10 through the least squares method on the basis of the following Expressions (4) and (5). In Expressions (4) and (5), the acceleration of a position of a center of gravity in the $X_E$ direction is defined as a first acceleration $a_x$ and the acceleration of a position of a center of gravity in the $Z_E$ direction is defined as a second acceleration $a_z$.

$$fx = m_{1x}a_x + m_{1z}a_z + m_{1o} \quad (4)$$

$$fz = m_{2x}a_x + m_{2z}a_z + m_{2o} \quad (5)$$

Figure 11:
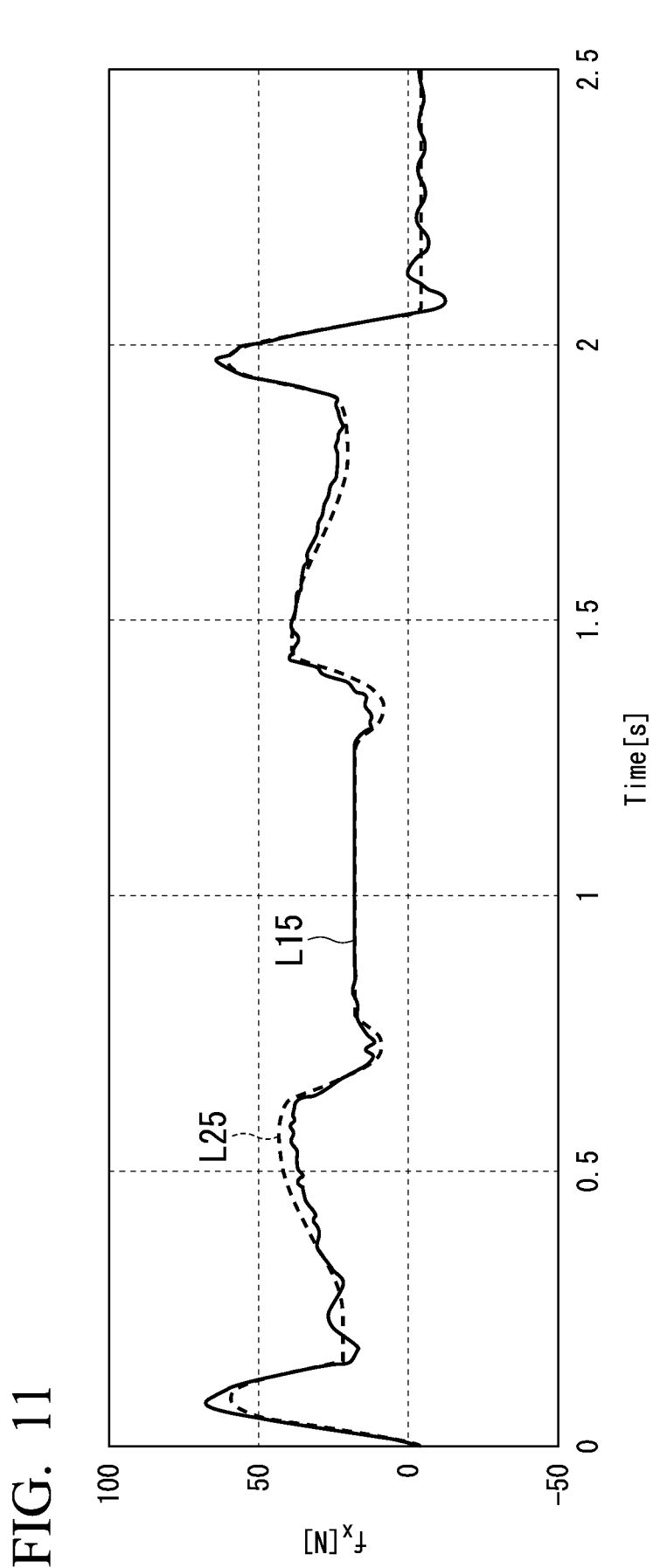
FIG. 11 is a graph for describing the results of fitting acceleration data during a high acceleration/deceleration high-speed operation illustrated in FIG. 9 on the basis of Expression (4).
Figure 12:
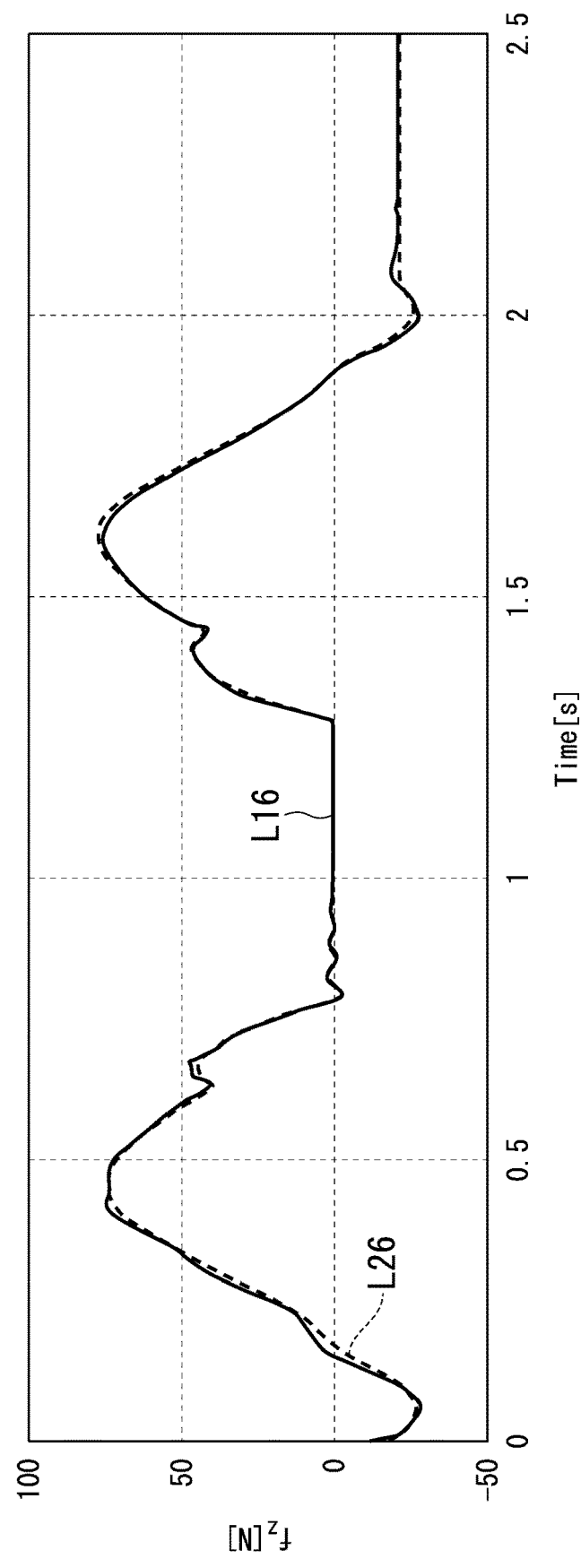
FIG. 12 is a graph for describing the result of fitting acceleration data during a high acceleration/deceleration high-speed operation illustrated in FIG. 10 on the basis of Expression (5).

FIGS. 11 and 12 are graphs for describing the results of fitting the acceleration data at the time of the high acceleration/deceleration high-speed operation illustrated in FIGS. 9 and 10 on the basis of the foregoing Expressions (4) and (5). In FIG. 11, with regard to the acceleration illustrated in FIG. 9, the acceleration which has not been subjected to the fitting is indicated using a solid line L15 and the acceleration which has been subjected to the fitting is indicated using a broken line L25. In FIG. 12, with regard to the acceleration illustrated in FIG. 10, the acceleration which has not been subjected to the fitting is indicated using a solid line L16 and the acceleration which has been subjected to the fitting is indicated using a broken line L26. When the changes illustrated in FIGS. 11 and 12 are obtained, inertial force compensation parameters mlx, $m_{1z}$, $m_{1o}$, $m_{2x}$, $m_{2z}$, and $m_{2o}$ have the following numerical values. The inertial force compensation parameters $m_{1x}$, $m_{1z}$, $m_{1o}$, $m_{2x}$, $m_{2z}$, and $m_{2o}$ are estimated and determined on the basis of the acceleration data of the position of the center of gravity of the arm part 110 when the suction hand 160 is subjected to a high acceleration/deceleration operation.

$m_{1x}=-2.0595e-01$ $m_{1z}=-2.2449e+00$ $m_{1o}=3.6781e+00$ $m_{2x}=2.3688e+00$ $m_{2z}=-2.1822e-01$ $m_{2o}=-3.5314e-01$

A position of a center of gravity of the suction hand 160 may be set to an approximate position and may not be set to a strict position. Even if there is a certain error in the position of the center of gravity of the suction hand 160, the error can be absorbed in a framework of the foregoing Expressions (4) and (5).

The above is the estimation procedure of the gravity compensation parameters and the inertial force compensation parameters in a state in which the suction hand 160 is in a no load state (a state in which the object to be conveyed P of 0 [kg] is conveyed).

Subsequently, the estimation apparatus repeatedly subjects the object to be conveyed P to which the mass has been added by 1 [kg] in some way until the mass of the object to be conveyed P conveyed by the suction hand 160 reaches 10 [kg] (Step S211) to an estimation process (Step S203 to S209) of gravity compensation parameters and inertial force compensation parameters with a mass added by 1 [kg] (Step S213).

If the mass of the object to be conveyed P reaches 10 [kg] by repeatedly performing the addition of the mass of 1 [kg] described above, the estimation apparatus creates the gravity compensation parameter table 282 and the inertial force compensation parameter table 284 on the basis of the gravity compensation parameters and the inertial force compensation parameters estimated through Step S205 and Step S209 (Step S215). Thus, the estimation apparatus ends the process illustrated in FIG. 6.

Figure 13:
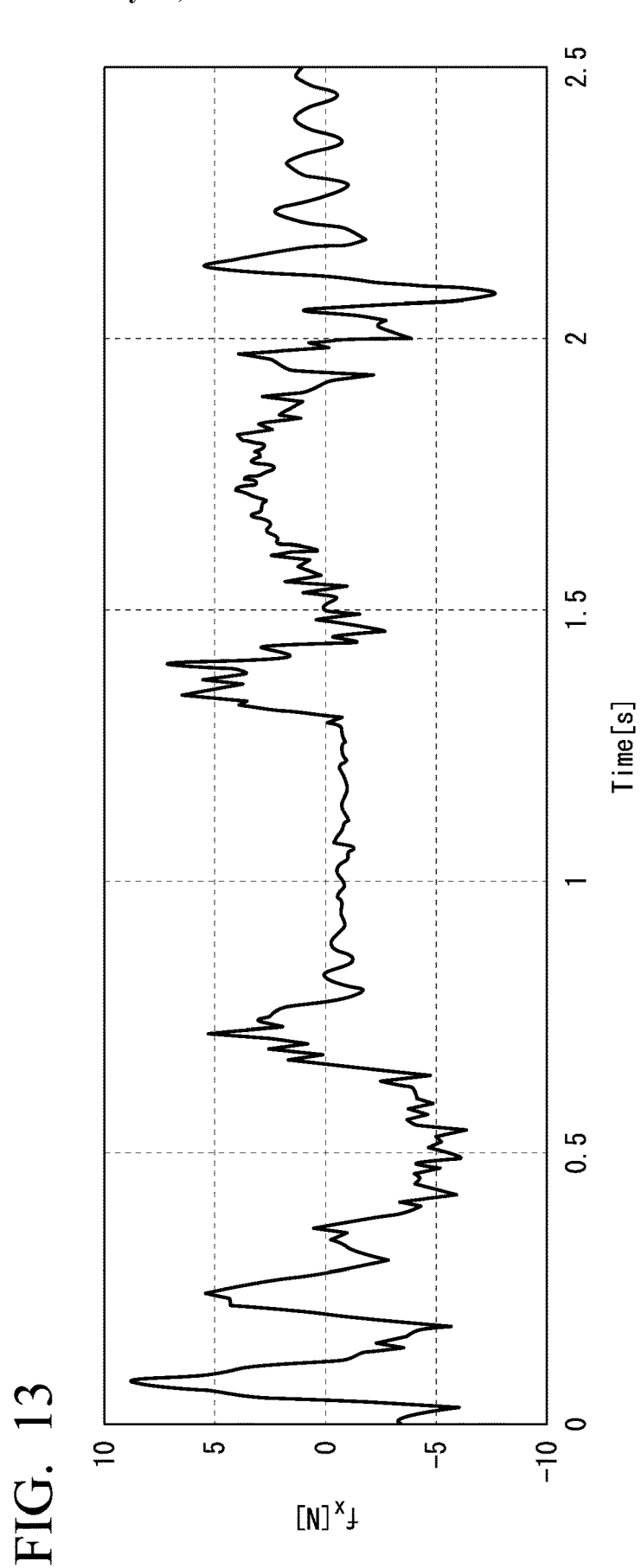
FIG. 13 is a graph for describing an example of a residual waveform of a first force fx when a force sensed by a force sensor 150 is subjected to gravity compensation and inertia compensation.
Figure 14:
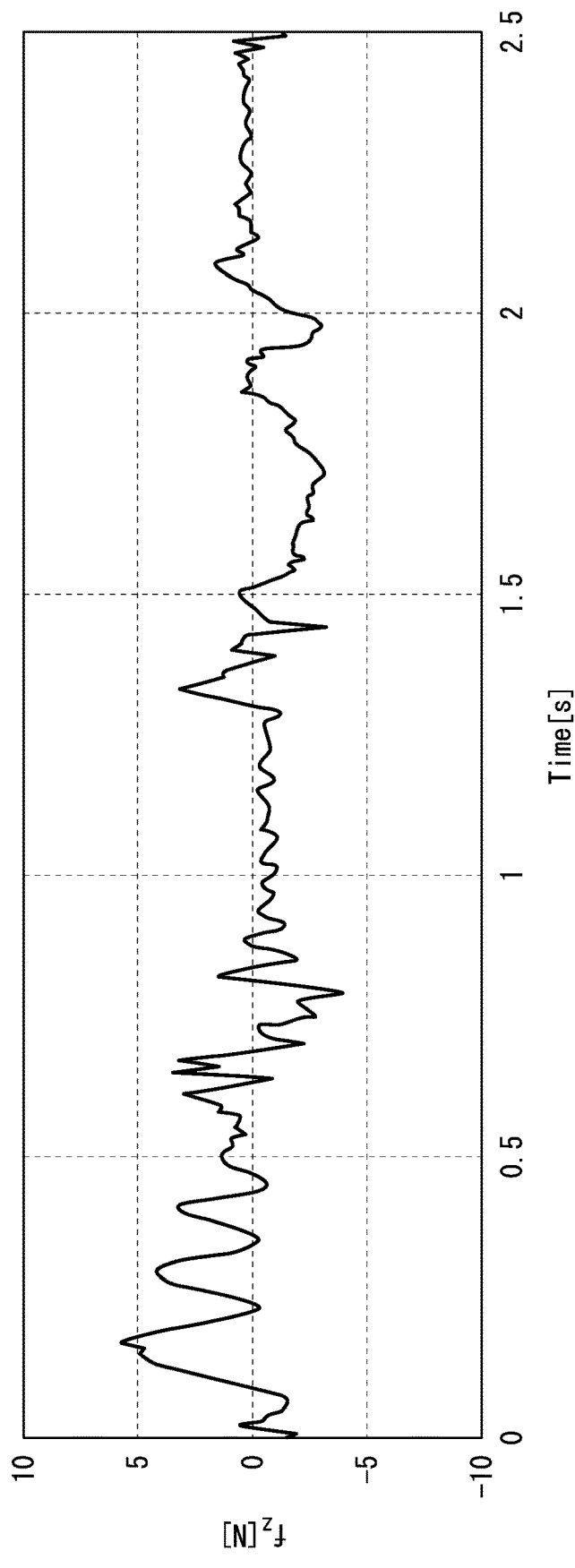
FIG. 14 is a graph for describing an example of a residual waveform of a second force fz when a force sensed by the force sensor 150 is subjected to gravity compensation and inertia compensation.

An example of collision detection using the controller 200 in the picking apparatus 1 will be described below. FIG. 13 is a graph for describing an example of a residual waveform of the first force fx when a force sensed by the force sensor 150 is subjected to gravity compensation and inertial force compensation. In addition, FIG. 14 is a graph for describing an example of a residual waveform of the second force fz. Here, the force sensed by the force sensor 150 is, for example, about 5 [N] to 10 [N].

As can be seen from FIGS. 13 and 14, also in both of the first force fx and the second force fz, the forces which have been subjected to the gravity compensation and the inertial force compensation fall within the range of 5 [N] to 10 [N]. As a result, since it is not necessary to take an influence of a gravitational force and an inertial force into consideration at the time of detecting a collision when the suction hand 160 is in a no load state, the collision threshold value 286 can be significantly reduced to about 1/10 when the influence of the gravitational force and the inertial force is taken into consideration.

For example, if the addition when a total of the masses of the suction hand 160 and the object to be conveyed P is 10 [kg] is accelerated by 10 [m/s2] (approximately 1 [G]), an inertial force of approximately 100 [N] is sensed by the force sensor 150. For this reason, if collision detection is to be performed as it is, it is necessary to set a large collision threshold value for the collision detection, which may lead to a decrease in detection accuracy in some cases. Furthermore, a gravitational force is also applied to the force sensor 150. Although a method based on a Kalman filter has been proposed for performing collision detection by removing a gravitational force and an inertial force from the sensed values sensed by the force sensor 150, when an object to be conveyed P of an unknown mass is gripped with an increased amount of calculation, the robustness of a transient performance of the Kalman filter is an issue. In this regard, in the above embodiment, collision detection is performed using arithmetic processing in which the predetermined gravity compensation parameters and inertial force compensation parameters are used. For this reason, similarly, also when the suction hand 160 conveys the object to be conveyed P, it is possible to reduce the collision threshold value 286 and minimize a decrease in detection accuracy. In addition, it is possible to perform collision detection simply and robustly to the extent that a CPU built into the controller 200 can perform calculation in real time.

In a state in which the suction hand 160 grips and conveys the object to be conveyed P, the picking apparatus 1 can calculate the mass of the object to be conveyed P on the basis of a difference between the forces corresponding to the sensed results of the force sensor 150 before and after the moment when the suction hand 160 grips the object to be conveyed P. For this reason, the picking apparatus 1 selects the gravity compensation parameters and the inertial force compensation parameters corresponding to the mass of the object to be conveyed P with reference to the gravity compensation parameter table 282 and the inertial force compensation parameter table 284. In the gravity compensation parameter table 282 and the inertial force compensation parameter table 284, the gravity compensation parameters and the inertial force compensation parameters, each of which is created in 11 sets of six sets in advance are included for a notch of a mass of 1 [kg] from 0 [kg] to 10 [kg]. For this reason, even when the mass of the object to be conveyed P is not obtained in advance, it is possible to easily detect the collision of the picking robot 100. Although a position of a center of gravity on which acceleration acts may change in accordance with the inertial force compensation parameters when the object to be conveyed P of a notch of 1 [kg] is gripped, these changes can be absorbed in the notch of the mass and the framework of Expressions (4) and (5).

Although the gravity compensation parameter table 282 and the inertial force compensation parameter table 284 by estimating the gravity compensation parameters and the inertial force compensation parameters are estimated for each 1 [kg] in the above embodiment, a unit for estimating the gravity compensation parameters and the inertial force compensation parameters may be finely carved for each 0.1 [kg], each 0.5 [kg], and the like or may be increased for each 2 [kg]. A unit for the mass for estimating the gravity compensation parameters and inertial force compensation parameters may not be at regular intervals or may differ between the gravity compensation parameters and the inertial force compensation parameters. The gravity compensation parameters and the inertial force compensation parameters can be arbitrarily determined by a user in accordance with the mass or the like of the object to be conveyed P. Although the gravity compensation parameters and the inertial force compensation parameters are determined with reference to the gravity compensation parameter table 282 and the inertial force compensation parameter table 284 in the above embodiment, an arithmetic expression in which the gravity compensation parameters and the inertial force compensation parameters are defined in advance may be determined for the object to be conveyed P in accordance with the mass. Although the calculator 220, the subtractor 230, the collision detector 240, and the operation control unit 250, which are examples of the control unit, is provided in the controller 200 which is separate from the picking robot 100 in the embodiment, the control unit may be provided in the picking robot 100.

According to at least one of the above-described embodiments, a picking apparatus which includes a gripper configured to pick and grip an object, an arm configured to move the gripper and cause the gripper to convey an object to be conveyed, a detector attached to the arm and configured to detect a force applied to the gripper, and a control unit configured to control an operation of the gripper and the arm, in which the control unit includes a calculator configured to calculate a gravitational force and an inertial force applied to the gripper when the gripper grips and moves the object to be conveyed using an arithmetic expression including a coefficient determined in accordance with a mass of the object to be conveyed and a subtractor configured to subtract the mass and the inertial force calculated by the calculator from a force applied to the gripper detected by the detector. Thus, it is possible to easily detect collision occurring during the conveyance of the object to be conveyed.

While some embodiments of the present invention have been described, these embodiments are presented as examples and are not intended to limit the scope of the invention. These embodiments can be implemented in various other forms and various omissions, replacements, and changes are possible without departing from the gist of the invention. These embodiments and modifications thereof are included in the scope and the gist of the invention, as well as in the scope of the invention described in the claims and the equivalent scope thereof.

REFERENCE SIGNS LIST

1 Picking apparatus
100 Picking robot
110 Arm
111 First joint
112 Second joint
113 Third joint
114 Fourth joint
115 Fifth joint
116 Sixth joint
121 First link
122 Second link
123 Third link
124 Wrist
150 Force sensor
160 Suction hand
200 Controller
210 Communicator
220 Calculator
222 Acquirer
224 Gravity compensator 226 Inertial force compensator
230 Subtractor
240 Collision detector
250 Operation control unit
280 Storage
282 Gravity compensation parameter table
284 Inertial force compensation parameter table
286 Collision threshold value
300 Interface

What is claimed is:

1. A picking apparatus, comprising:
a gripper configured to pick and grip an object to be conveyed;
an arm configured to move the gripper and cause the gripper to convey the object to be conveyed;
a detector attached to the arm and configured to sense a force applied to the gripper; and
a control unit configured to control an operation of the gripper and the arm,
wherein the control unit comprises at least one of a hardware processor configured to execute a software program and a hardware circuitry, the hardware processor executes the software program or the hardware circuitry operates to cause the control unit to:
estimate, by performing a fitting process based on an offline least square method, gravity compensation parameters and inertial force compensation parameters as parameters for a real-time gravitational force and as parameters for inertial force compensation calculations;
select a compensation gravity calculation expression for calculating a compensation gravity value;
select a set of gravity compensation parameters according to a mass of the object;
calculate, by applying the selected gravity compensation parameters to the selected compensation gravity calculation expression, a gravity component, as a compensation gravity value, included in the force sensed by the detector;
select a compensation inertial force calculation expression for calculating a compensated inertial force value;
select a set of inertial force compensation parameters according to the mass of the object;
subtract the compensation gravity value and the compensated inertial force value from the force sensed by the detector, for compensating a difference between gravitational force and inertial force in a state in which an object to be conveyed is gripped by the gripper; and
detect a collision on the basis of a result of comparison between a subtraction result and a predetermined collision threshold value.

2. The picking apparatus according to claim 1, wherein the compensation selected compensation gravity calculation expression and the compensation inertial force calculation expression each include a coefficient, the coefficient including a first coefficient when the gripper is in a no load state in which the gripper is not gripping the object to be conveyed and a second coefficient when the gripper has a load.

3. The picking apparatus according to claim 1, wherein the compensation selected compensation gravity calculation expression and the compensation inertial force calculation expression each include a coefficient, the coefficient including a first coefficient when the gripper is in a no load state in which the gripper does not grip the object to be conveyed and a classification correspondence coefficient classified in accordance with a mass of the object to be conveyed gripped by the gripper.

4. The picking apparatus according to claim 3, wherein the circuitry is further configured to cause the control unit to:
acquire a mass of the object to be conveyed; and
select a coefficient corresponding to the acquired mass.

5. The picking apparatus according to claim 1, wherein the compensation selected compensation gravity calculation expression includes a gravity calculation coefficient for calculating the gravitational force and the compensation inertial force calculation expression includes an inertial force calculation coefficient for calculating the inertial force, and
the gravity calculation coefficient is determined based on angle data of the arm.

6. The picking apparatus according to claim 1, wherein the compensation selected compensation gravity calculation expression includes a gravity calculation coefficient for calculating the gravitational force and the compensation inertial force calculation expression includes an inertial force calculation coefficient for calculating the inertial force, and
the inertial force calculation coefficient is determined based on acceleration data of the arm.

7. A control apparatus, comprising:
a gripper configured to pick and grip an object to be conveyed;
an arm configured to move the gripper and cause the gripper to convey an object to be conveyed;
a control unit configured to control a picking robot which includes a detector attached to the arm and configured to sense a force applied to the gripper; and
wherein the control unit comprises at least one of a hardware processor configured to execute a software program and a hardware circuitry, the hardware processor executes the software program or the hardware circuitry operates to cause the control unit to:
acquire a mass of the object to be conveyed by the gripper on the basis of a sensing signal of a force applied to the gripper,
estimate, by performing a fitting process based on an offline least square method, gravity compensation parameters and inertial force compensation parameters as parameters for a real-time gravitational force and as parameters for inertial force compensation calculations;
select a compensation gravity calculation expression for calculating a compensation gravity value;
select a set of gravity compensation parameters according to a mass of the object;
calculate, by applying the selected gravity compensation parameters to the selected compensation gravity calculation expression, a gravity component, as a compensation gravity value, included in the force sensed by the detector;
select a compensation inertial force calculation expression for calculating a compensated inertial force value;
select a set of inertial force compensation parameters according to the mass of the object;
subtract the compensation gravity value and the compensated inertial force value from the force sensed by the detector, for compensating a difference between gravitational force and inertial force in a state in which an object to be conveyed is gripped by the gripper; and detect a collision on the basis of a result of comparison between a subtraction result and a predetermined collision threshold value.

8. A non-transitory storage medium storing a program which causes a control apparatus configured to control a picking robot,
wherein the picking robot comprising:
a gripper configured to pick and grip an object to be conveyed;
an arm configured to move the gripper and cause the gripper to convey the object to be conveyed; and
a detector attached to the arm and configured to sense a force applied to the gripper, and
wherein the program, when executed, causes the control apparatus to:
estimate, by performing a fitting process based on an offline least square method, gravity compensation parameters and inertial force compensation parameters as parameters for a real-time gravitational force and as parameters for inertial force compensation calculations;
select a compensation gravity calculation expression for calculating a compensation gravity value;
select a set of gravity compensation parameters according to a mass of the object;
calculate, by applying the selected gravity compensation parameters to the selected compensation gravity calculation expression, a gravity component, as a compensation gravity value, included in the force sensed by the detector;
select a compensation inertial force calculation expression for calculating a compensated inertial force value;
select a set of inertial force compensation parameters according to the mass of the object;
subtract the compensation gravity value and the compensated inertial force value from the force sensed by the detector, for compensating a difference between gravitational force and inertial force in a state in which an object to be conveyed is gripped by the gripper; and
detect a collision on the basis of a result of comparison between a subtraction result and a predetermined collision threshold value.

* * * * *